United States Patent [19]

Detwiler

[11] Patent Number: 5,053,094
[45] Date of Patent: Oct. 1, 1991

[54] METHOD OF FORMING AT AMBIENT TEMPERATURES ANNULAR SEALS IN THE CUSHION LAYERS OF TIRES BEING RETREADED

[76] Inventor: Richard H. Detwiler, 15 Easter Ave., Windham, Me. 04062

[21] Appl. No.: 507,234

[22] Filed: Apr. 9, 1990

[51] Int. Cl.$^5$ ............................................. B29D 30/56
[52] U.S. Cl. .................................... 156/96; 156/128.1; 156/909
[58] Field of Search ..................... 156/96, 128.1, 130.3, 156/130.5, 394.1, 909, 87

[56] References Cited

U.S. PATENT DOCUMENTS

| | | | |
|---|---|---|---|
| 3,925,129 | 12/1975 | Blankenship | 156/96 |
| 3,989,563 | 11/1976 | Schelkmann | 156/96 |
| 4,098,936 | 7/1978 | Rawls | 428/40 |
| 4,174,239 | 11/1979 | Symmes | 156/96 |

*Primary Examiner*—Caleb Weston
*Assistant Examiner*—Geoffrey L. Knable

[57] ABSTRACT

A method of retreading a stitched tire having a cushion layer of uncured rubber between its buffed surface and the undersurface of it uncured rubber curable at temperatures above 200° F. utilizes tensioned bands including its margins of the tread material. The bands are of a prestressed, long chain synthetic polymer which becomes elastic with reduced tensile strength at temperatures above 200° F. The bands are tensioned to an extent such that the underlying margins of the cushion layer are forced into such intimate contact with the buffed surface of the tire and the undersurface of the tread material as to form temporary gas impermeable seals at the interfaces and at the same time insure that, while the cushion layer is being cured at tempeatures above 200° F., the tread material is held in place by the bands with a compressive force inadequate to cause extrusion of the cushion layer rubber in excess of a bead which is approximately one half the thickness of the cushion layer.

8 Claims, 2 Drawing Sheets

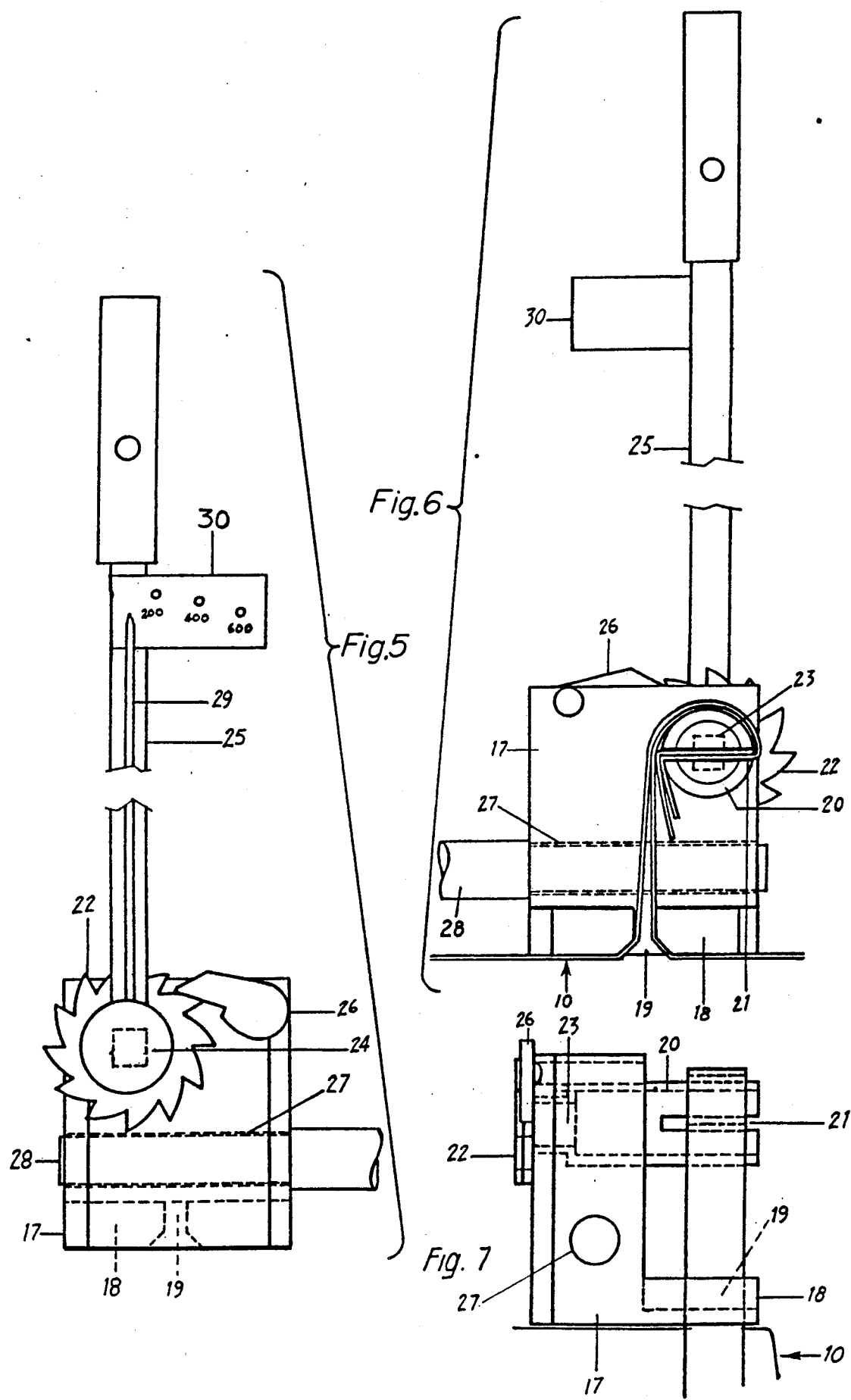

METHOD OF FORMING AT AMBIENT TEMPERATURES ANNULAR SEALS IN THE CUSHION LAYERS OF TIRES BEING RETREADED

BACKGROUND OF THE INVENTION

The radial truck tire industry in this country predominantly utilizes precured tread material to cover the buffed area of the casing with a cushion layer of uncured rubber between them.

Curing systems for such rebuilt tires require that either the entire tire or the outer surface thereof be enveloped before being subjected to a curing medium in a suitable temperature range and at an appropriate pressure. Pressures within the curing chamber force the tread material against the cushion layer and the casing but, due to the tread design, pressure is distributed unequally resulting in the migration of the softened cushion layer to areas of lower pressure. Such migrations cause a distorted tread and in some areas, reduced strength. A further disadvantage to the use of envelopes is that they have an insulating effect which slows the build-up of heat within it.

It has been proposed, see U.S. Pat. No. 3,136,673 to R. J. Carver, to provide a cushion layer consisting of two parts, one layer on the buffed area of the casing and the other on the underside of the precured tread material. When the two layers were brought together, cross-linking occurred at ambient temperatures. With a steel belt locked about the entire tread and the tire inflated, the assembly was placed in a warm environment to speed the cross-linking. The difficulty with this procedure was that the cured cushion was weak. In addition, the procedure, if used with radial casings, would require appropriately crowned steel bands.

In U.S. Pat. No. 3,925,129 to J. D. Blankenship, a tire retreading system employed non stretchable bands encircling the margins of the tread surface of the precured tread material after the rebuilt tire had been stitched. In order that the tensioned bands would function to maintain seals between the casing and the tread material, the tires were provided with inner tubes and mounted on rims and the band tensions increased either by inflating the tire against the resistance of the bands or by temporarily reducing the outside diameter of the tire before placing the bands in position and then allowing the tire to return towards its original size against the bands. One of the short comings of this system is that inner tubes are required in retreading bias tires with high enough inflation pressures to insure that the tires, which have a natural tendency to become elastic in the hot curing medium, maintain their diameters, or want to grow slightly lest the seals be lost at the interfaces. Another short coming is that radial tires with their girdling belts under the treads, are for practical purposes, dimensionally stable to both temperature and inflation pressure changes and therefore cannot be inflated to tension the bands nor their diameter reduced by spreading the beads to allow band tensioning as with the bias weave tires.

In accordance with U.S. Pat. No. 4,098,936 to V. Rawls, the precured tread material was formed with gutter-like grooves marginally of the tread surface. After a tire was rebuilt and stitched, a retaining wire was wrapped tightly around each groove to hold the tread in place during curing. Retainers which could be expanded before being placed in the grooves as well as those that would contract to tighten them were also discussed.

In my copending application Ser. No. 161031, filed Feb. 26, 1988, interfaces are protected against being penetrated by curing media by extruding uncured rubber, curable at temperatures above 200° F., over the margins of the casing and the tread material to form blending layers.

THE PRESENT INVENTION

The general objective of the present invention is to produce a method of retreading tires, not requiring envelopes, which utilizes, at ambient temperatures, the cushion layer of uncured rubber between the precured tread and the buffed casing of a tire as the source of temporary seals operable to prevent the penetration of the interfaces by hot fluids under pressure and the displacement of the tread material when the tire is in a curing chamber.

In accordance with the invention, this objective is attained, after a tire has been rebuilt with the tread material assembled on a buffed casing with a cushion layer of uncured rubber between the material and the casing and after the assembly has been stitched, by applying annular pressure closely adjacent to each side margin of the tread material. The pressure is applied by means of flat, prestressed and tensioned bands which are non stretchable at ambient temperatures but become elastic at 200° F., with the pressure applied at least for a sufficient length of time to cause the uncured rubber of the cushion layer to creep into intimate contact with the buffed surfaces of the casing and the tread material. Some precured tread material has its inner surface covered with a fabric, and after its removal, the imprint thereof remains. The terms "buffed areas" or "buffed surfaces" as used herein also includes surfaces such as those having imprints. The bands are typically hard surfaced.

Such bands are ideal for use in practising the method of the present invention. Once it has been determined what compressive force can be maintained on the tread surface without causing extrusion of the cushion layer rubber while it is being cured, that would necessitate a subsequent buffing operation then it can be determined what compressive force can be applied to establish that final force and at the same time establish gas impermeable, temporary interface seals before the rebuilt tire is exposed to the curing medium.

Polyester bands ranging from ¼ to 2 inches in width are well adapted for use with bands in the ⅜ to ⅝ inches range preferred. Bands wider than two inches can be used but are less cost effective and are more difficult to use under production conditions. The use of bands in the 0.010 to the 0.025 thickness range is preferred as thicker bands are less flexible making proper band tensions more difficult to secure.

Tensions of less than 100 PSI do not enable effective temporary seals to be formed and tensions over 900 PSI can distort some casings and could cause excessive extrusion of the uncured cushion layer rubbers at ambient temperatures. While some minor extrusion may sometimes occur with band tensions below 900 PSI, a bulge of the cushion layer at the interfaces that protrudes past the tread edges approximately one half the thickness of the cushion layer stock is a good indicator that an effective seal has been established. Such bulges may not appear until the cushion layer has been cured and a preexisting lesser bulge may be more noticeable.

Temperatures less than 200° are impractical for curing cushion layers and do not cause the bands to relax. Normal curing chamber temperatures achieve both results.

The needed initial compressive forces vary not only with the width and thickness of the bands but also with the size of the tires being retreaded. In general, the initial compressive force must, as above noted, be established with a pulling, band-tensioning force in the approximate range of from 100 to 900 pounds. As the band width only increases from a minimum, the required tensioning forces increase to achieve a wanted compressive force at temperatures above 200° F. Given a medium size truck such as an 11R24.5 tire, which is herein regarded as one of average size, corresponding tensioning forces decrease as tire diameters decrease and increase as tire diameters increase.

With a truck tire, of average size, the compressive force on the tread surface during the curing interval is in the approximate range of from 3 PSI to 9 PSI.

For practical purposes, the established tension need not exceed 60% of a band's tensile strength but, of course, may be substantially higher during band tensioning. The length of time during which the annular pressure must be applied to form interface seals depends on the PSI applied by the tensioned bands which pressure is dependent on the extent to which the bands are tensioned. For example, if the applied, compressive force initially applied to the tread surface is to be in the approximate range of from 16 to 42 PSI, the tension must be maintained at least for intervals in the approximate range of from 15 to 2 minutes before the tire is subjected to the curing medium to permit the temporary seals to become formed.

In practise, the bands are tensioned so that the seal forming step is completed in ten minutes or less so as not to cause any appreciable delay in preparing a tire for entry into a curing chamber. A strapped tire should not be left for next day entry into the curing chamber. While an initial compressive force is in the 16 to 42 PSI range, the preferred pressure is in the 20 to 30 PSI range and is maintained for at least 5 minutes. When the curing is to be accomplished in a hot air or inert gas cure, where heat and pressure are independent, the strapped tire may be immediately placed in the chamber and exposed to elevated temperatures to soften the cushion layer to insure that it has found intimacy with both buffed surfaces prior to the pressurizing of the chamber.

While a permissible and generally desirable extrusion, at least after the cushion layer has been cured, of a bulge not appreciably in excess of one half the thickness of the cushion layer has been stated, it should be noted that such a minor extrusion neither materially reduces the thickness of the cushion layer underlying the tensioned bands nor creates stress zones.

More extensive extrusions may have two additional causes (apart from the wrong compressive forces). One of these is that in the event the cushion layer has to be trimmed to match the undersurface of the tread material, the trimmed margin may depart from a straight edge so that minor protrusions on minor cavities may exist at an interface. Another cause of unwanted extrusions is the existence of a repaired area of the tread in a margin of an interface. Such extrusions or cavities can be eliminated as objections as by wiping action along the interface with an appropriately heated and shaped tool.

When the buffed surface of the casing is substantially flat, the bands can be held as by staples until tensioned. When any appreciable radius exists, the bands, even when tensioned, may need to be prevented from sliding off the tread surface. For that purpose, the bands may be interconnected at circumferentially spaced zones by clips which for convenience, may be attached to an encircling band. Experience with the invention has shown that normally all medium and full sized truck tires are sufficiently flat in buffed radius not to require any type of retainer between the bands.

The ends of the bands may be joined and tensioned in various ways using for example, such clamps as toggle clamps, ratchet clamps or conventional commercial strapping units and seals. Whatever system is used must enable approximately the same tension to be reestablished on the tread material.

BRIEF DESCRIPTION OF THE DRAWINGS

The accompanying drawings illustrate the preferred manner of practising the invention

FIG. 5 is a side view of a band tensioning clamp of the ratchet type with its handle and operating arm broken away to foreshorten the figure;

FIG. 6 is a view showing the opposite side of the clamp with the clamp positioned on the tread material and the ends of a band drawn about the shaft of the ratchet wheel as the ratchet was operated to tension the band; and FIG. 7 is an end view of the holder of the clamp with its handle and arm removed and with the ends of the band pulled around the shaft and locked by the ratchet.

THE PREFERRED EMBODIMENT

Figure 1:
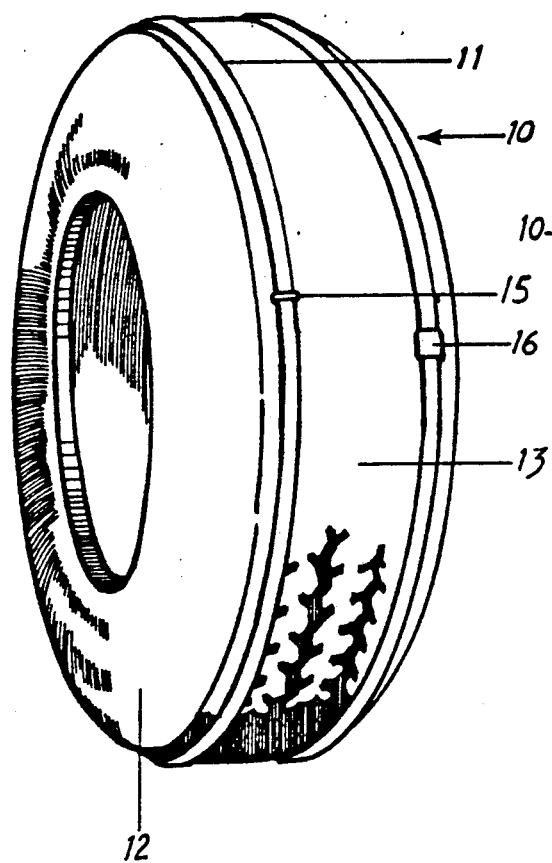
FIG. 1 is a perspective view of a rebuilt tire prepared for entry into curing chamber.
Figure 2:
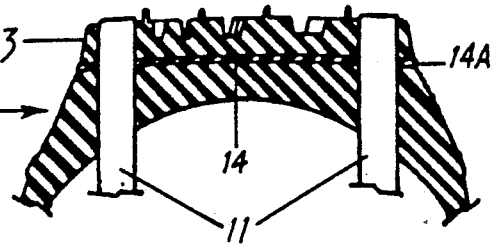
FIG. 2 is a fragmentary cross sectional view of the tire.

In FIG. 1, a radial tire generally indicated at 10, has been conventionally rebuilt except for the added tensioned bands 11 and is ready to be placed in a curing chamber, not shown.

In the rebuilding of the tire 10, its casing 12, was buffed as was the inner surface of the precured tread material 13 which has been fitted on the casing 12 with a cushion layer 14 of uncured rubber, curable at temperature above 200° F., between it and the casing. Other conventional structural features of the tire 10 are omitted or not detailed to simplify the disclosure. Cushion layer stock is available in different widths and thicknesses and having different cure rates. For the tire 10, the stock used to form the cushion layer 14 was one sixteenth of an inch in thickness and of a rapid cure type and was trimmed to the width of the inner surface of the tread material 13. As is conventional, the tread material fitted to the casing may consist of a single length or a plurality of sections with all abutting ends spliced. The thus rebuilt tire is then stitched.

Figure 3:
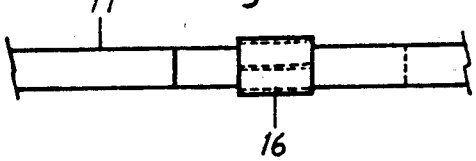
FIG. 3 is a fragmentary plan view illustration of the tire.

In accordance with the invention, the tire 10 was readied for the curing chamber by providing it with the encircling prestressed polyester bands 11, one close to each side of the tread surface of the tread material 13. In practise, each band is initially held in place as by a staple 15 midway between its ends which are then drawn together about the tread material and tensioned with their ends held together. For convenience, the ends of one band 11 are shown in FIGS. 1 and 3 as held together with one end overlapping the other end by a clip 16 such as are used with conventional banding equipment. The staples can be removed once the bands are under tension.

In practise, each band 11 is tensioned to an extent such that the PSI applied to the underlying tread material 13 and cushion layer 14 is such as to force the uncured rubber into intimate contact with the buffed surfaces of the tread material and the casing during an interval, 10 minutes or less, that does not require any appreciable delay in placing the tire in a curing chamber. As previously noted, when the band 11 is properly tensioned, the margins of the cushion layer 14 may and commonly do appear as slight bulges 14A.

The following chart gives the initial band tensions in pounds of pulling force and the resulting PSI applied to the tread for band widths in the preferred ⅜ to ⅝ inches in width and the resulting band tensions and compressive forces when the bands are heated above 200° F. The chart also includes corresponding figures for the other band widths in the useable range of from ¼ to 2 inches and for band thicknesses in the 0.010 to 0.025 range.

CHART OF FORCES ACTING IN AND FROM
PRE-STRESSED POLYESTER BANDS ON TRUCK TIRES
11R24.5 NOMINAL SIZE

| WIDTH OF BAND | THICKNESS OF BAND | | |
|---|---|---|---|
| | .010" | .018" | .025" |
| ¼" | 82#/16 | 150/30 | 208/41 |
| | 16/3.3 | 30/6 | 41/8.2 |
| ⅜" | 124/16 | 225/30 | 312/41 |
| | 25/3.3 | 45/6 | 62/8.2 |
| ½" | 165/16 | 300/30 | 416/41 |
| | 33/3.3 | 60/6 | 83/8.2 |
| ⅝" | 208/16 | 375/30 | 520/41 |
| | 41/3.3 | 75/6 | 104/8.2 |
| ¾" | 250/16 | 450/30 | 625/41 |
| | 50/3.3 | 90/6 | 125/8.2 |
| 1" | 333/16 | 600/30 | 833/41 |
| | 66/3.3 | 120/6 | 122/8.2 |
| 2" | 666/16 | 1200*/30 | 1666*/41 |
| | 133/3.3 | 240/6 | 333/8.2 |

THIS TENSION IS BELOW THE 100 POUND MINIMUM
*THESE TENSIONS EXCEED THE 900 POUND MAXIMUM
CODE: THE ABOVE CHART SHOWS FOUR NUMBERS PER COMBINATION
† TENSION & COMPRESSION AT AMBIENT
‡ TENSION & COMPRESSION ABOVE 200 F.
1. THE TENSION IN THE BAND AT ROOM TEMPERATURE - POUNDS PULLING FORCE
THE NUMBER SHOWN IS 60% OF THE ULTIMATE TENSILE STRENGTH AS A REASONABLE WORKING TENSION. THE SET OR DESIRED TENSION CAN BE ANYTHING LESS THAN THIS.
2. THE PRESSURE COMPRISING THE CUSHION @ ROOM TEMP. - PSI
3. THE TENSION AS #1 EXCEPT ABOVE 200 DEGREES F.
THE NUMBER SHOWN IS A FUNCTION OF THE BAND CROSS SECTION, THE COLD ELONGATION AND THE FACT THAT IT IS WARM ENOUGH TO BE ELASTIC. IT IS FOR PRACTICAL PURPOSES A CONSTANT.
4. THE PRESSURE AS #2 EXCEPT ABOVE 200 DEGREES F
NOTE:
THIS CHART IS FOR A TYPICAL 11 R 24.5 TIRE. TO CORRECT FOR A VERY SMALL TIRE THE TENSIONS WOULD REMAIN THE SAME BUT THE COMPRESSION NUMBERS (2 & 4) WOULD INCREASE ABOUT 66%. IF THE TIRE WERE AT THE UPPER SIZE LIMIT THE COMPRESSION WOULD DECREASE ABOUT 26%. THESE ARE BASED ON THE ASSUMPTION THAT AN AVERAGE TIRE IS 40" IN DIAMETER, THE SMALLEST IS 24" AND THE LARGE LIMIT IS 54". THE SMALLER THE TIRE THE HIGHER THE COMPRESSION FOR THE SAME BAND TENSION & VICE VERSA. FORCES ARE ASSUMED TO FLOW STRAIGHT THRU THE TREAD WITHOUT SPREADING.

Figure 4:
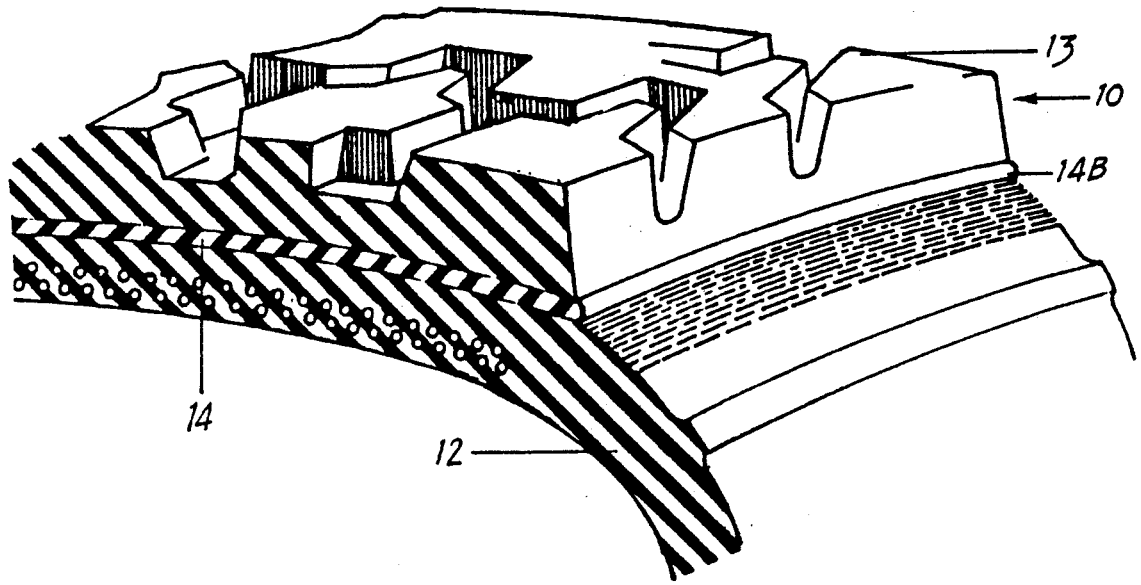
FIG. 4 is a fragmentary section, connected ends of the bands of FIG. 1, on a substantial increase in scale, of the tire after its removal from the curing chamber and with the bands removed.

The curing chamber may be a conventional steam, hot air or inert gas chambers for any type of which the appropriate temperatures, pressure and time requirements are well known. There is no preference as to curing systems as long as it provides a curing temperature over 200° F. and not more than 350° F. and has sufficient pressure to prevent porosity in the cushion layer. When the tire 10 is removed from the curing chamber, it will be noted, see FIG. 4, that the side margins of the cushion layer are in the form of small bulges or beads 14B which represent slight extrusions occurring in the curing chamber as the heat therein was relaxing the band tensions or slight enlargements of the preexisting bulges or beads 14A, but not appreciably exceeding one half the thickness of the cushion layer.

It should be noted that if the curing medium is hot air or a hot inert gas, a strapped tire can be immediately exposed thereto. While it is theoretically possible, given ideal conditions, to remove the bands once the temporary, gas impermeable seals are formed, there would still be the risk of tread movement while the tire is in the curing chamber. It is, accordingly, a true requirement of the invention that the bands not be removed until the tire is removed from the chamber in which the cushion layer rubber was cured as it is the slight annular bulge 14B that affords proof of successful retreading.

It is necessary to be able to establish substantially uniform tension on all bands of like tires and to interconnect the ends of each tensioned band. Reference is made to FIGS. 5, 6, and 7 in which a tensioning and end locking clamp is shown which has proved easy to use in properly tensioning the straps. Suitable tension is initially determined by experience, for example, if any appreciable amount of cushion layer rubber is extruded during strap tensioning, the tension and the resulting compressive force are excessive.

The tool illustrated by FIG. 6–8, has a holder 17 the base of which has an offset 18 divided by a transverse slot 19 below and spaced at one side of one end of a shaft 20 rotatably held by the holder 17. That end of the shaft 20 has a transverse slot 21 and the other end of the shaft 20 has a ratchet wheel 22 fixed thereon and also has a square axial socket 23 dimensioned to detachably receive the square protuberance 24 on one side of the tensioning arm or lever 25. A pawl 26 pivotably connected to the holder 17 is yieldably held against the ratchet wheel 22 by gravity. In addition, the holder 17 has a bore 27 extending from end to end thereof dimensioned slidably to receive the appropriate end of a handle 28.

In use, the ends of a band 11 are both extended through the slots 19 and 21 and holder 17 is seated on the tread surface in a position such that the band 11 is closely adjacent a side thereof with the portions of the band ends entering the slot 19 in contact with each other. With the handle 28, detachably attached to the holder 17, the tool is held in position by one hand of the operator and the arm 25 is pulled by the other hand to turn the shaft with the ends of the band 11 locked and wrapped together about the slotted end of the shaft 20. As the band becomes tensioned, the applied tension is indicated by the position of the pointer 29 relative to the scale 30 on the arm 25 which is so dimensioned as to bend as the band is tensioned. Once the wanted tension is established, the handle and arm are removed before the tire 10 is placed in the curing chamber. When the curing step is complete, the bands 11 and the mounts are easily removed.

It will be apparent from the foregoing that the compressive force initially applied to the tread material and necessary to form the temporary, gas impermeable annular seals at the interfaces, would, if maintained during the curing interval, cause excessive extrusions as the cushion layer softened. Prestressed polyester bands, appropriately tensioned to insure the formation of the temporary annular seals, when subjected to the hot curing medium, have their tensions self regulating to establish and maintain the wanted, reduced compressive force on the tread material whether the bands shrink or are stretched, provided that the initial compressive force is properly related thereto.

I claim:

1. The method of retreading a tire having a buffed surface with precured tread material having a buffed or imprinted inner surface, said method consisting of the steps of assembling the tread material on the tire with a cushion layer of uncured rubber, curable at temperatures above 200° F. between said surfaces and in contact therewith, the width of the cushion layer equal to the width of said inner surface, stitching the assembly, encircling each margin of the tread surface with a flat and hard surfaced band of a prestressed, long chain polymer which is substantially inextensible at ambient temperatures but becomes elastic with reduced tensile strength at temperatures above 200° F., the width of the bands in the one qu rter to two inch range, tensioning each band with a pulling force in the approximate range of 100 to 900 pounds and maintaining the tension at least for an interval in the approximate range of from two to forty five minutes to establish a compressive force in a PSI range such that the annular portions of the cushion layer underlying the bands are forced into complete contact with said surfaces without any significant reduction in their thickness with the annular portions becoming temporary gas impermeable seals at the interfaces of the casing an he tread material and effective to hold the tread material against movement, and then subjecting the tire to a hot fluid under pressure and for a time adequate to effect the curing of the cushion layer rubber without gas penetrating the interfaces during the curing interval, each band, as the curing temperature rises above 200° F., exerting a decreasing compressive force to about 20% of that initially applied the compressive force applied during the curing interval such that at the end of the curing interval, any extrusion of the cushion layer is in the form of an annular bead the thickness thereof not appreciably exceeding one half the thickness of the cushion layer.

2. The method of claim 1 in which the compressive force applied to the tread material during the curing interval is in the approximate range of 3 to 9 PSI and increases from the minimum to the maximum as the thickness of the bands increases.

3. The method of claim 1 in which the thickness of the bands is in the approximate range of 0.010 to 0.025 inches.

4. The method of claim 3 in which the width of the bands is in the approximate range of ⅜ to ⅝ inches.

5. The method of claim 1 in which the thickness of the band is in the approximate range of 0.010 to 0.025 inches and the width of the bands is in the approximate range of ⅜ to ⅝ inches.

6. The method of claim 1 in which the seal forming compressive force is such that the seals are established within 10 minutes.

7. The method of claim 1 in which the pulling force applied to the bands establishes a tensioning force of about 60% of their elastic limits.

8. The method of claim 1 in which the diameter of the tire is within the range of from 24 to 54 inches, the compressive force employed to establish the temporary seals is in the approximate range of from 16 to 42 PSI for a 11R24.5 tire and such pressures are increased with the same tension as the diameter of a tire decrease by about 66% for a 24 inch tire and decrease as the diameter of tires increases by about 26% in the case of a 54 inch tire.

* * * * *